United States Patent [19]

Staendeke et al.

[11] Patent Number: 5,312,853

[45] Date of Patent: May 17, 1994

[54] FLAME RETARDANT POLYMERIC COMPOSITIONS

[75] Inventors: Horst Staendeke, Lohmar, Fed. Rep. of Germany; Daniel J. Scharf, East Greenwich, R.I.

[73] Assignee: Hoechst Celanese Corporation, Somerville, N.J.

[21] Appl. No.: 126,142

[22] Filed: Sep. 23, 1993

Related U.S. Application Data

[63] Continuation of Ser. No. 669,799, Mar. 15, 1991, abandoned, which is a continuation-in-part of Ser. No. 87,186, Aug. 19, 1987, abandoned.

[30] Foreign Application Priority Data

Aug. 25, 1986 [DE] Fed. Rep. of Germany ....... 3628797
Jun. 16, 1987 [DE] Fed. Rep. of Germany ....... 3720094

[51] Int. Cl.$^5$ ............................................. C08K 5/3492
[52] U.S. Cl. .................................. 524/100; 524/416; 523/179; 523/206
[58] Field of Search ............... 523/179, 206; 524/100, 524/416

[56] References Cited

U.S. PATENT DOCUMENTS

| | | | |
|---|---|---|---|
| 4,198,493 | 4/1980 | Marciandi | 525/164 |
| 4,467,056 | 8/1984 | Staendeke et al. | 523/179 |
| 4,670,483 | 6/1987 | Hall et al. | 523/179 |

*Primary Examiner*—Kriellion S. Morgan
*Attorney, Agent, or Firm*—Hugh C. Crall

[57] ABSTRACT

Flame-retardant polymeric compositions, preferably thermoplastic and especially polyolefin-based compositions, containing an intumescent flame-retardant system substantially comprised of a phosphorus component and an organic nitrogen component. The flame-retardant system is more particularly comprised of ammonium polyphosphate and tris-(2-hydroxyethyl) isocyanurate.

16 Claims, No Drawings

FLAME RETARDANT POLYMERIC COMPOSITIONS

This is a continuation of copending application(s) Ser. No. 07/669,799 filed on Mar. 15, 1991 now abandoned.

BACKGROUND OF INVENTION

This invention related to flame-retardant polymeric compositions, especially to thermoplastic compositions, particularly based on polyolefins, containing an intumescent flame-retardant system comprised substantially of a phosphorus component and an organic nitrogen component.

In U.S. Pat. No. 4,140,660 it has been suggested that phosphonic acid derivatives of isocyanuric acid are useful for imparting flame-retardant properties to polyurethanes. U.S. Pat. No. 4,001,177 also describes a combination of melamine and isocyanuric acid derivatives for imparting flame-retardant properties to polyamides.

U.S. Pat. No. 3,810,862 appears to be the first reference to disclose the use of an intumescent mixture to impart flame-retardant properties to polyolefins; this mixture consisting of ammonium polyphosphate, melamine and dipentaerythritol or melamine pyrophosphate and dipentaerythritol. In U.S. Pat. No. 4,312,805 (DE-OS 28 00 891), a three-component mixture of ammonium polyphosphate, melamine and polyamide 6 (of Example 6) is suggested, and in U.S. Pat. No. 4,198,493 (DE-OS 28 39 710) a further series of three-component mixtures are suggested consisting of ammonium polyphosphate, melamine and tris-(2-hydroxyethyl) isocyanurate (cf. Examples 2, 5, 6, 7, 8) or ammonium polyphosphate, pentaerythritol or tripentaerythritol and tris-(2-hydroxyethyl) isocyanurate (cf. Examples 4, 9) or ammonium polyphosphate, cyanuric acid and tris-(2-hydroxyethyl) isocyanurate (cf. Examples 13, 14) as intumescent agents imparting flame-retardant properties to polyolefins. It has also been disclosed (cf. U.S. Pat. No. 4,461,862) that a combination of ammonium polyphosphate and the reaction product of an oxygen acid of phosphorus with a hydroxy-alkyl derivative of isocyanuric acid can conveniently be used for this purpose.

U.S. Pat. No. 4,727,102, however, to Scarso discloses flame retardant polypropylene composition having a "V-O" UL 94 rating consisting of 15% ammonium polyphosphate and 20% of tris-(hydroxy-ethyl)-isocyanurate but the product had "poor mechanical and thermal characteristics." Scarso teaches to incorporate melamine cyanurate into the formulation in order to obtain a flame retardant polymer composition having good mechanical and thermal properties.

We have now found that a two-component system, consisting of ammonium polyphosphate (APP) and tris-(2-hydroxy-ethyl)-isocyanurate (THEIC) imparts very good flame-retardant properties to polyolefins. This was more particularly an unexpected result as the other components of the three- component systems specified hereinabove when used in a two-component system with ammonium polyphosphate did not have any flame-retardant activity whatsoever (cf. comparative Examples 1-12 herein) and the Scarso reference teaches that poor mechanical and thermal properties would be expected of this two component (APP-THEIC) system.

We have found that the two component flame retardant system of the invention provides:

(a) high flame retardancy properties; i.e. UL94-VO rating and high oxygen index;
(b) high mechanical strength properties;
(c) low smoke emission; and
(d) improved environmental safety.

SUMMARY OF THE INVENTION

The present invention provides flame-retardant polymeric compositions, especially thermoplastie compositions and more especially polyolefin-based compositions containing an intumescent flame-retardant system comprised substantially of a phosphorus component and an organic nitrogen component. The flame-retardant system of the invention is a two-component mixture consisting substantially of ammonium polyphosphate and tris-(2-hydroxyethyl) isocyanurate. The flame-retardant system preferably consists of from about 80 to 50 weight percent ammonium polyphosphate and from about 20 to about 50 weight percent tris-(2-hydroxyethyl) isocyanurate. The flame-retardant system is used in a flame-retardant quantity to reduce the flammability of the base polymer; preferably in an amount of 15 to 40 weight percent based on the total weight of the flame-retardant polymer composition.

The flame-retardant polymer composition is further characterized in that the ammonium polyphosphate contains 0.5 to 25 weight % of:

a) a water-insoluble artificial, preferably cured, resin encapsulating the individual ammonium polyphosphate particles;

b) a reaction product of a polyisocyanate with a carbodiimidization catalyst, the polycarbodiimide formed encapsulating the individual ammonium polyphosphate particles;

c) a reaction product of a polyisocyanate and a polyhydroxy compound, the polyurethane formed encapsulating the individual ammonium polyphosphate particles;

d) a reaction product of a polyisocyanate with a trimerization catalyst, the polyisocyanurate formed encapsulating the individual ammonium polyphosphate particles;

e) a reaction product of a polyisocyanate and water, the polyurea formed encapsulating the individual ammonium polyphosphate particles;

f) a cured melamine/formaldehyde-resin, the melamine/formaldehyde resin encapsulating the individual ammonium polyphosphate particles;

g) a cured epoxide resin, the epoxide resin encapsulating the individual ammonium polyphosphate particles.

DESCRIPTION OF THE PREFERRED EMBODIMENTS

The ammonium phosphate component of the invention is exemplified by the free flowing, pulverulent, sparingly water-soluble ammonium polyphosphates of the formula $(NH_4PO_3)_n$ in which n stands for an integer from about 200 to 1000, preferably about 700, with a particle size such that more than 99 weight percent of the particles have a size of less than 45 μm. An example of such polyphosphates is "Exolit 422" (registered trademark; manufactured and sold by Hoechst AG) having the composition $(NH_4PO_3)_n$, in which n is higher than 200.

In accordance with this invention, the flame-retardant polymer compositions can contain from 15 to 40 weight percent of the two-component, flame-retardant mixture. The two component, flame retardant system contains from about 50 to about 80 weight percent of ammonium polyphosphate and from about 20 to 50 percent by weight of tris-(2-hydroxyethyl) isocyanurate. Prefereably the ammonium polyphosphate component is present in the two component system in an amount from about 65 percent to about 80 percent by weight and tris-(2-hydroxyethyl)-isocyanurate is present in an amount of about 20 percent to about 35 percent by weight; most preferably 75 to 80 percent by weight of ammonium polyphosphate and about 20 to about 25 percent of tris-(2-hydroxyethyl) isocyanurate.

Preferably, the amount of ammonium polyphosphate used in the flame retardant compositions of the invention is at least about 20 percent by weight based upon the total weight of the flame retardant polymer composition and the ratio (weight basis) of ammonium polyphosphate to tris-(2-hydroxyethyl) isocyanurate is at least about 2:1; most preferably at least about 3:1 to about 4:1 and no more than about 5:1. We have found that the two component flame retardant composition should comprise at least about 30 percent by weight of the flame retardant polymer composition; preferably about 35 percent.

Any of the various polymer or polymer compositions may be treated, both thermoplastic and thermoset, for instance a polyolefin, like polyethylene, polypropylene, polybutylene-1, and poly-4-methylpentene-1; a copolymer of one or more olefins, like a crystalline copolymer of ethylene and propylene, a rubber-like copolymer of ethylene, propylene and cyclopentadiene as the third monomer, and other elastomeric materials such as polyesterpolyether copolymers, thermoplastic polyurethanes; a homo- and copolymer of alkenylaromatic compounds, such as polystyrene and polymethylstyrene; a copolymer of an alkenyl-aromatic compound and butadiene and/or acrylonitrile, such as rubber-like styrene-butadiene copolymer, a copolymer of styrene and acrylonitrile or a graft copolymer of styrene and/or acrylonitrile on polybutadiene (ABS resin); acrylic polymers, like polyethyl acrylate and polymethylmethacrylate; a cellulose derivative, such as cellulose acetate and cellulose nitrate; a phenolformaldehyde resin; a urea-formaldehyde resin; a melamine-formaldehyde resin; a polyamide; a polyester, (thermoplastic and thermoset); polyvinylchloride; polyformaldehyde; butyl rubber, polyisoprene and other kinds of rubber; an epoxy resin; a polycarbonate, etc. and mixtures or blends thereof. Excellent results are attained with polymers such as polyolefins.

The polymer compositions of the present invention may be prepared by conventional methods. It is preferable that the flame retardants and other additives be dispersed in the polymer as uniformly as possible. Therefore, any of the known methods which are suitable for obtaining a uniform dispersion may be used. In accordance with one method, the additives may be added to the particulated polymer which can be optionally mixed to obtain a uniform blend; the mixture or blend is melt-blended in an extruder, and formed into pellets. In another method, the powdered or ground polymer and flame-retardant additives may be uniformly mixed and formed into tablets by conventional methods. A blend of the tablets may be fed to an extruder for melt mixing and pelletizing. The blend may also be directly fed to a molding machine such as screw injection molding machine. Alternatively, a master batch pellet or particle containing a high concentration of the flame-retardant additive compounds and low concentration of polymer may be prepared on a roll mill or a mixing extruder. The master batch pellets may be then blended with the polymer and processed as described above.

The compositions of the present invention may further contain dyestuffs, pigments, fillers, fiber-reinforcing agents, lubricants, plasticizers, antistatic agents and stabilizers.

The following Examples and Tables are intended to illustrate the invention which is naturally not limited thereto.

EXAMPLE 1 (Comparative Example)

The following additives in the amount set forth were used in this Example:

5000 g of HOSTALEN* PPU 0180 P—a polypropylene powder having a melt index MFI 230/5 of about 55 g/10 minutes; 1500 g of EXOLIT* 422—a fine particulate, sparingly water-soluble ammonium polyphosphate of the formula $(NH_4PO_3)_n$, in which n is about 700 and more than 99% of the particles have a size of less than 45 μm; 500 g of melamine; 100 g of KRONOS** CL 220—a titanium dioxide pigment (rutile grade); 10 g calcium stearate; 10 g of HOSTANOX* SE 03—an antioxidant based on polynuclear phenols, and 10 g of HOSTANOX* PAR 24—an aromatic phosphite [tris-(2,4-ditertbutylphenol) phosphite].

In the above description and hereinafter the * and ** indicate registered trademarks of Hoechst Aktiengesellschaft, Frankfurt, Federal Republic of Germany and Kronos Titan, Leverkusen, Federal Republic of Germany, respectively.

The above ingredients were mixed in an intensive mixer (20 l capacity), extruded at 180°-200° C. in a laboratory extruder (20 mm screw diameter) and granulated in a laboratory granulator. The dried, granulated material was introduced into a steam-heated compression molding press and molded at a temperature of 195° C. and under a pressure of 2-3 bars (5-10 minutes) or 300 bars (2 minutes) into test plates 1.6 mm thick and 3.2 mm thick.

The flammability of the composition was tested in accordance with the Underwriters Laboratories procedure "Test for Flammability of Plastic Material-UL 94" dated as of May 2, 1975, on specimens 127 mm long, 12.7 mm wide and 1.6 and 3.2 mm thick and the oxygen index was determined substantially in accordance with ASTM-D 2863. These tests were used throughout this disclosure to measure the flammability properties of the compositions reported herein. The results of the flammability tests are reported in Table 1.

EXAMPLE 2 (Comparative Example)

The procedure of Example 1 was repeated but 1000 g of EXOLIT* 422 and 1000 g of melamine were used. The results of the flammability tests are listed in Table 1.

EXAMPLE 3 (Comparative Example)

The procedure of Example 1 was repeated but 500 g of EXOLIT* 422 and 1500 g of melamine were used. The results of the flammability tests are listed in Table 1.

EXAMPLE 4 (Comparative Example)

The procedure of Example 1 was repeated but the melamine was replaced by 500 g of cyanuric acid. The results of the flammability tests are listed in Table 1.

EXAMPLE 5 (Comparative Example)

The procedure of Example 2 was repeated but the melamine was replaced by 1000 g of cyanuric acid. The results of the flammability tests are listed in Table 1.

EXAMPLE 6 (Comparative Example)

The procedure of Example 3 was repeated but the melamine was replaced by 1500 g of cyanuric acid. The results of the flammability tests are listed in Table 1.

EXAMPLE 7 (Comparative Example)

The procedure of Example 1 was repeated but the melamine was replaced by 500 g of melamine cyanurate. The results of the flammability tests are listed in Table 2.

EXAMPLE 8 (Comparative Example)

The procedure of Example 2 was repeated but the melamine was replaced by 1000 g of melamine cyanurate. The results of the flammability tests are listed in Table 2.

EXAMPLE 9 (Comparative Example)

The procedure of Example 3 was repeated but the melamine was replaced by 1500 g of melamine cyanurate. The results of the flammability tests are listed in Table 2.

EXAMPLE 10 (Comparative Example)

The procedure of Example 1 was repeated but the melamine was replaced by 500 g of MADURIT* MW 909 which was used in the form of a melamine/formaldehyde-resin cured for 2 hours at 180.C prior to use. MADURIT* MW 909 is an unplasticized melamine/-formaldehyde-resin commercially available in the form of a white powder. A 50 weight percent solution has a dynamic viscosity of about 30 mPa.S, a pH of 9.0–10.0 and a density (at 20° C.) of 1.21–1.225 g/ml. The results of the flammability tests are listed in Table 2.

EXAMPLE 11 (Comparative Example)

The procedure of Example 2 was repeated but the melamine was replaced by 1000 g of MADURIT* MW 909, which was in the form of a melamine/formaldehyde-resin which had been cured for 2 hours at 180° C. prior to use. The results of the flammability tests are listed in Table 2.

EXAMPLE 12 (Comparative Example)

The procedure of Example 3 was repeated but the melamine was replaced by 1500 g MADURIT* MW 909, which was used in the form of a melamine/formaldehyde-resin cured for 2 hours at 180° C. The results of the flammability tests are listed in Table 2.

EXAMPLE 13 (invention)

The procedure of Example 1 was repeated but the melamine was replaced by 500 g of tris-(2-hydroxyethyl) isocyanurate (THEIC). The results of the flammability tests are listed in Table 3.

EXAMPLE 14 (invention)

The procedure of Example 2 was repeated but the melamine was replaced by 1000 g of tris-(2-hydroxyethyl) isocyanurate (THEIC). The results of the flammability tests are listed in Table 3.

EXAMPLE 15 (invention)

The procedure of Example 3 was repeated but the melamine was replaced by 1500 g of tris-(2-hydroxyethyl) isocyanurate (THEIC). The results of the flammability tests are listed in Table 3.

EXAMPLE 16 (invention)

The procedure of Example 1 was repeated but 1312.5 g of EXOLIT* 422 and (instead of 500 g of melamine) 437.5 g of THEIC were used. The results of the flammability tests are listed in Table 3.

EXAMPLE 17 (invention)

The procedure of Example 1 was repeated but 875 g of EXOLIT* 422 and (instead of 500 g of melamine) 875 g of THEIC were used. The results of the flammability tests are listed in Table 3.

EXAMPLE 18 (invention)

The procedure of Example 1 was repeated but 1125 g of EXOLIT* 422 and (instead of 500 g of melamine) 375 g of THEIC were used. The results of the flammability tests are listed in Table 3.

EXAMPLE 19 (invention)

The procedure of Example 1 was repeated but 750 g of EXOLIT* 422 and (instead of 500 g of melamine) 750 g of THEIC were used. The results of the flammability tests are indicated in Table 3.

EXAMPLE 20 (invention)

The procedure of Example 16 was repeated but EXOLIT* 422 was replaced by 1312.5 g of EXOLIT* 462.

The EXOLIT* 462 is a microencapsulated ammonium polyphosphate made by the process described in German Specification DE-OS 35 31 500, containing about 10 weight % of encapsulating material consisting of a cured melamine/formaldehyde resin.

The results of the flammability tests are indicated in Table 4.

EXAMPLE 21 (invention)

The procedure of Example 18 was repeated but the EXOLIT* 422 was replaced by 1125 g of EXOLIT* 462.

The results of the flammability tests are indicated in Table 4.

EXAMPLE 22 (invention)

The procedure of Example 16 was repeated but the EXOLIT* 422 was replaced by 1312.5 g of EXOLIT* 470.

The EXOLIT* 470 is a microencapsulated ammonium polyphosphate made by the process described in German Specification DE-OS 35 26 006, containing about 10 weight % of encapsulating material consisting of the reaction product of a polyisocyanate and a carbodiimidization catalyst.

The results of the flammability tests are indicated in Table 4.

EXAMPLE 23 (invention)

The procedure of Example 18 was repeated but EXOLIT* 422 was replaced by 1125 g of EXOLIT* 470.

The results of the flammability test are indicated in Table 4.

The comparative materials melamine, cyanuric acid, melamine cyanurate and melamine/formaldehyde-resin (MADURIT* MW 909) were found in the flammability tests to be definitely unsuitable for use in two-component system with ammonium polyphosphate as a flame-retardant composition for thermoplastic materials; (cf. Table 1 and 2).

In clear contrast therewith, the ammonium polyphosphate/tris-(2-hydroxyethyl) isocyanurate composition was very effective (cf. Tables 3 and 4). Specimens 3.2 mm thick made from material in which 35 parts of this composition were used per 100 parts of polypropylene could be classified in class UL 94 V-0.

Comparison physical properties for APP/THEIC (invention), typical halogen and, 3-component non-halogen flame retardant formulations are presented in Table 5, 6 and 7. An excellent trade-off in property balance is demonstrated for APP/THEIC formulations #1, #2, #3 and #4 in Table 5. Compared with commercial halogen formulations #5, #6 in Table 6, the physical properties of the invention are superior in respect to tensile, flexural, impact, smoke generation, and specific gravity. The non-halogen 3-component formulations #7, #8, #9 in Table 7 show reduced performance in tensile, flexural, elongation and impact properties.

TABLE 1

Flammability Test in Accordance with UL-94-vertical test[1]
Oxygen Index in Accordance with ASTM-D 2863-74

| Ex. No. | Material | Flame-retardant System Quantity... parts/100 parts PP[2] | UL-94-vertical test 1.6 mm | UL-94-vertical test 3.2 mm | Oxygen Index 1.6 mm | Oxygen Index 3.2 mm |
|---|---|---|---|---|---|---|
| 1 (compar) | EXOLIT* 422 Melamine | 30 10 | n.c.[3] | n.c | 0.22 | 0.23 |
| 2 (compar) | EXOLIT* 422 Melamine | 20 20 | n.c. | n.c. | 0.22 | 0.22 |
| 3 (compar) | EXOLIT* 422 Melamine | 10 30 | n.c. | n.c | 0.20 | 0.21 |
| 4 (compar) | EXOLIT* 422 Cyanuric Acid | 30 10 | n.c. | n.c. | 0.19 | 0.20 |
| 5 (compar) | EXOLIT* 422 Cyanuric Acid | 20 20 | n.c. | n.c | 0.19 | 0.19 |
| 6 (compar) | EXOLIT* 422 Cyanuric Acid | 10 30 | n.c. | n.c. | 0.19 | 0.19 |

[1] Underwriters Laboratories "Test for Flammability of Plastic Material -UL 94" Specimens: 127 mm long, 12.7 mm wide and 1.6 mm or 3.2 mm thick
[2] PP = Polypropylene
[3] n.c. = not classified as V-0, V-1, or V-2

TABLE 2

Flammability Test in Accordance with UL-94-vertical test[1]
Oxygen Index in Accordance with ASTM-D 2863-74

| Ex. No. | Material | Flame-retardant System Quantity... parts/100 parts PP[2] | UL-94-vertical test 1.6 mm | UL-94-vertical test 3.2 mm | Oxygen Index 1.6 mm | Oxygen Index 3.2 mm |
|---|---|---|---|---|---|---|
| 7 (compar) | EXOLIT* 422 Melamine Cyanurate | 30 10 | n.c.[3] | n.c. | 0.21 | 0.22 |
| 8 (compar) | EXOLIT* 422 Melamine Cyanurate | 20 20 | n.c. | n.c. | 0.20 | 0.20 |
| 9 (compar) | EXOLIT* 422 Melamine Cyanurate | 10 30 | n.c. | n.c. | 0.19 | 0.20 |
| 10 (compar) | EXOLIT* 422 MADURIT* MW 909 | 30 10 | n.c. | n.c. | 0.19 | 0.20 |
| 11 (compar) | EXOLIT* 422 MADURIT* MW909 | 20 20 | n.c. | n.c. | 0.19 | 0.19 |
| 12 (compar) | EXOLIT* 422 MADURIT* MW 909 | 10 30 | n.c. | n.c. | 0.19 | 0.19 |

[1] Underwriters Laboratories "Test for Flammability of Plastic Material -UL 94" Specimens: 127 mm long, 12.7 mm wide and 1.6 mm or 3.2 mm thick
[2] PP = Polypropylene
[3] n.c. = not classified as V-0, V-1, or V-2

TABLE 3

Flammability Test in Accordance with UL-94-vertical test[1]
Oxygen Index in Accordance with ASTM-D 2863-74

| Ex. No. | Material | Flame-retardant System Quantity... parts/100 parts PP[2] | UL-94-vertical test 1.6 mm | UL-94-vertical test 3.2 mm | Oxygen Index 1.6 mm | Oxygen Index 3.2 mm |
|---|---|---|---|---|---|---|
| 13 (invention) | EXOLIT* 422 THEIC[3] | 30 10 | V-2 | V-0 | 0.31 | 0.33 |
| 14 (invention) | EXOLIT* 422 THEIC | 20 20 | V-2 | V-1 | 0.27 | 0.28 |
| 15 (invention) | EXOLIT* 422 THEIC | 10 30 | n.c.[4] | n.c. | 0.25 | 0.26 |
| 16 (invention) | EXOLIT* 422 THEIC | 26.25 8.75 | n.c. | V-0 | 0.30 | 0.30 |
| 17 | EXOLIT* 422 | 17.5 | n.c. | n.c. | 0.27 | 0.27 |

TABLE 3-continued

Flammability Test in Accordance with UL-94-vertical test[1]
Oxygen Index in Accordance with ASTM-D 2863-74

| Ex. No. | Material | Flame-retardant System Quantity ... parts/100 parts PP[2] | UL-94-vertical test 1.6 mm | UL-94-vertical test 3.2 mm | Oxygen Index 1.6 mm | Oxygen Index 3.2 mm |
|---|---|---|---|---|---|---|
| (invention) | THEIC | 17.5 | | | | |
| 18 | EXOLIT* 422 | 22.5 | n.c. | V-1 | 0.29 | 0.29 |
| (invention) | THEIC | 7.5 | | | | |
| 19 | EXOLIT* 422 | 15 | n.c. | n.c. | 0.25 | 0.26 |
| (invention) | THEIC | 15 | | | | |

[1] Underwriters Laboratories "Test for Flammability of Plastic Material -UL 94" Specimens: 127 mm long, 12.7 mm wide and 1.6 mm or 3.2 mm thick
[2] PP = Polypropylene
[3] THEIC - Tris-(2-hydroxyethyl)-isocyanurate
[4] n.c. = not classified as V-0, V-1, or V-2

TABLE 4

Flammability Test in Accordance with UL-94-vertical test[1]
Oxygen Index in Accordance with ASTM-D 2863-74

| Ex. No. | Material | Flame-retardant System Quantity ... parts/100 parts PP[2] | UL-94-vertical test 1.6 mm | UL-94-vertical test 3.2 mm | Oxygen Index 1.6 mm | Oxygen Index 3.2 mm |
|---|---|---|---|---|---|---|
| 20 | EXOLIT* 462 | 26.25 | V-2 | V-0 | 0.28 | 0.29 |
| (invention) | THEIC[3] | 8.75 | | | | |
| 21 | EXOLIT* 462 | 22.5 | n.c. | V-1 | 0.25 | 0.26 |
| (invention) | THEIC | 7.5 | | | | |
| 22 | EXOLIT* 470 | 26.25 | V-2 | V-0 | 0.31 | 0.32 |
| (invention) | THEIC | 8.75 | | | | |
| 23 | EXOLIT* 470 | 22.5 | n.c. | V-1 | 0.26 | 0.27 |
| (invention) | THEIC | 7.5 | | | | |

[1] Underwriters Laboratories "Test for Flammability of Plastic Material -UL 94" Specimens: 127 mm long, 12.7 mm wide and 1.6 mm or 3.2 mm thick
[2] PP = Polypropylene
[3] THEIC - Tris-(2-hydroxyethyl)-isocyanurate
[4] n.c. = not classified as V-0, V-1, or V-2

TABLE 5

| Formulation | (Wt. %) | | Control | #1 | #2 | #3 | #4 |
|---|---|---|---|---|---|---|---|
| Polypropylene(1) | | | 97.2 | 67.2 | 69.2 | 71.5 | 67.2 |
| Exolit 422 | | | | 22.5 | 21.0 | 19.2 | 18 |
| THEIC | | | | 7.5 | 7.0 | 6.4 | 12 |
| Antioxidant/Pigment | | | 2.8 | 2.8 | 2.8 | 2.8 | 2.8 |
| Flammability Test | ASTM | Units | | | | | |
| Oxygen Index | D-2863 | (% Oxygen) | 17.6 | 35.9 | 35.5 | 35.3 | 39.0 |
| UL-94 Rating (1/16)* | | | NR | V-0 | V-0 | V-0 | V-0 |
| Avg. Burn Time | | sec. | cont. | 1.1 | 1.5 | 2.3 | 1.0 |
| Smoke(2) | | % Trans. | 99% | 97% | 97% | 97% | 97% |
| Physical Properties | | | | | | | |
| Heat Deflection @264 psi | D-648 | deg. F. | 122 | 137 | 132 | 129 | 127 |
| Tensile Strength | D-638 | PSI 10[3] | 4.8 | 4.5 | 3.9 | 3.9 | 3.9 |
| Elongation | D-638 | @yield (%) | 16.5 | 10.4 | 11.2 | 12.3 | 12.3 |
| Flex. Strength | D-790 | PSI 10[3] | 7.8 | 8.1 | 7.5 | 7.5 | 7.5 |
| Flex. Modulus | D-790 | PSI 10[5] | 1.8 | 2.8 | 2.7 | 2.4 | 3.0 |
| Notched Izod | D-256E | ft lb/in | 1.1 | 0.4 | 0.4 | 0.4 | 0.3 |
| Shore Hardness | D-1706 | D scale | 69.3 | 64.7 | 72.0 | 64.7 | 70.7 |
| Specific Gravity | | g/cc | 0.9 | 1.06 | 1.05 | 1.03 | 1.05 |

(1) Hostalen PP (U0180)
(2) % light transmission measured by optical density
*1.6 mm

TABLE 6

| Formulation | (Wt. %) | | Control | #5 | #6 |
|---|---|---|---|---|---|
| Polypropylene(1) | | | 97.2 | 49.2 | 64.2 |
| Dechloranet 25(2) | | | | 38.0 | |
| DBDPO(3) | | | | | 25.0 |
| Antimony Oxide | | | | 4.0 | 8.0 |
| Zinc Borate | | | | 6.0 | |
| Antioxidant/Pigment | | | 2.8 | 2.8 | 2.8 |
| Flammability Test | ASTM | Units | | | |
| Oxygen Index | D-2863 | (% Oxygen) | 17.6 | 29.7 | 26.4 |
| UL-94 Rating (1/16) | | | NR | V-0 | V-0 |
| Avg. Burn Time | | sec. | cont. | 2.4 | 1.9 |
| Smoke(4) | | % Trans. | 99% | 75% | 60% |
| Physical Properties | | | | | |
| Heat Deflection @264 psi | D-648 | deg. F. | 122 | 148 | 130 |
| *Tensile Strength | D-638 | PSI 10[3] | 4.8 | 2.9 | 3.9 |
| Elongation | D-638 | @yield (%) | 16.5 | 10.4 | 7.3 |

TABLE 6-continued

| Formulation | (Wt. %) | | Control | #5 | #6 |
|---|---|---|---|---|---|
| Flex. Strength | D-790 | PSI 10³ | 7.8 | 6.6 | 7.9 |
| Flex. Modulus | D-790 | PSI 10⁵ | 1.8 | 3.9 | 2.2 |
| Notched Izod | D-256E | ft lb/in | 1.1 | 0.2 | 0.4 |
| Shore Hardness | D-1706 | D scale | 69.3 | 74.0 | 72.0 |
| Specific Gravity | | g/cc | 0.9 | 1.26 | 1.20 |

(1)Hostalen PP (U0180)
(2)Dechlorane 25 is a chlorinated alicyclic additive
(3)Decabromodiphenyloxide
(4)% light transmission measured by optical density
*Yield

TABLE 7

| Formulation | (Wt. %) | | Control | #7 | #8 | #9 |
|---|---|---|---|---|---|---|
| Polypropylene(1) | | | 97.2 | 67.2 | 67.2 | 67.2 |
| Exolit 422 | | | | 10.0 | 18.0 | 18.0 |
| THEIC | | | | | | 6.0 |
| Melamine | | | | 10.0 | 6.0 | 6.0 |
| Pentaerythritol | | | | 10.0 | 6.0 | |
| Antioxidant/Pigment | | | 2.8 | 2.8 | 2.8 | 2.8 |
| Flammability Test | ASTM | Units | | | | |
| Oxygen Index | D-2863 | (% Oxygen) | 17.6 | 29.1 | 31.2 | 35.8 |
| UL-94 Rating (1/16 in.) | | | NR | V-2 | V-1 | V-0 |
| Avg. Burn Time | | sec. | cont. | 6.2 | 5.4 | 0.9 |
| Smoke(2) | | % Trans. | 99% | 96% | 96% | 96% |
| Physical Properties | | | | | | |
| Heat Deflection | D-648 | deg. F. @264 psi | 122 | 115 | 113 | 152 |
| *Tensile Strength | D-638 | PSI 10³ | 4.8 | 3.7 | 4.0 | 4.4 |
| Elongation | D-638 | @yield (%) | 16.5 | 7.5 | 10.3 | 7.3 |
| Flex. Strength | D-790 | PSI 10³ | 7.8 | 7.1 | 7.4 | 7.0 |
| Flex. Modulus | D-790 | PSI 10⁵ | 1.8 | 1.9 | 2.7 | 2.5 |
| Notched Izod | D-256E | ft lb/in | 1.1 | 0.3 | 0.3 | 0.2 |
| Shore Hardness | D-1706 | D scale | 69.3 | 70.0 | 70.7 | 72.3 |
| Specific Gravity | | g/cc | 0.9 | 1.03 | 1.05 | 1.05 |

(1)Hostalen PP (U0180)
(2)% light transmission measured by optical density
*Yield

We claim:

1. A flame-retardant polymer composition, containing an intumescent flame-retardant system consisting essentially of ammonium polyphosphate and tris-(2-hydroxyethyl) isocyanurate wherein said ammonium polyphosphate is present in an amount of at least about 20 percent by weight based upon the total weight of said polymer composition and wherein the ratio of ammonium polyphosphate to tris-(2-hydroxyethyl) isocyanurate on weight basis is at least about 2:1.

2. A flame-retardant polymer composition according to claim 1, wherein the said ammonium polyphosphate contains 0.5 to 25 weight % of a water-insoluble synthetic resin encapsulating the individual ammonium polyphosphate particles.

3. A flame-retardant polymer composition according to claim 2, wherein the said water-insoluble resin is cured.

4. A flame-retardant polymer composition according to claim 1, wherein the said ammonium polyphosphate contains 0.5 to 25 weight % of a reaction product of a polyisocyanate with a carbodimidization catalyst, the polycarbodiimide formed encapsulating the individual ammonium polyphosphate particles.

5. A flame-retardant polymer composition according to claim wherein the said ammonium polyphosphate contains 0.5 to 25 weight % of a reaction product of a polyisocyanate and a polyhydroxy compound, the polyurethane formed encapsulating the individual ammonium polyphosphate particles.

6. A flame-retardant polymer composition according to claim 1, wherein the said ammonium polyphosphate contains 0.5 to 25 weight % of a reaction product of a polyisocyanate with a trimerization catalyst, the polyisocyanurate formed encapsulating the individual ammonium polyphosphate particles.

7. A flame-retardant polymer composition according to claim 1, wherein the said ammonium polyphosphate contains 0.5 to 25 weight % of a reaction product of a polyisocyanate and water, the polyurea formed encapsulating the individual ammonium polyphosphate particles.

8. A flame-retardant polymer composition according to claim 1, wherein the said ammonium polyphosphate contains 0.5 to 25 weight % of a cured melamine/formaldehyde-resin, the melamine/formaldehyde resin encapsulating the individual ammonium polyphosphate particles.

9. A flame-retardant polymer composition according to claim 1, wherein the said ammonium polyphosphate contains 0.5 to 25 weight % of a cured epoxide resin, the epoxide resin encapsulating the individual ammonium polyphosphate particles.

10. A flame-retardant polymer composition according to claim 1, wherein said ammonium polyphosphate is a free flowing, pulverulent, sparingly water-soluble ammonium polyphosphate of the formula $(NH_4PO_3)_n$, in which n is an integer from 200 to about 1000.

11. A flame-retardant polymer composition according to claim 10, wherein n is an integer of about 700.

12. A flame-retardant polymer composition according to claim 1, wherein at least about 99 percent by weight of said ammonium polyphosphate has a particle size less than about 45 μm.

13. A flame-retardant polymer composition according to claim 1, wherein said ammonium phosphate and tris-(2-hydroxyethyl) isocyanurate are present in a ratio of about 3:1 to about 4:1 and wherein said ammonium phosphate and tris-(2-hydroxyethyl) isocyanurate comprises about 30 to about 40 percent of said polymer composition.

14. A flame-retardant polymer composition according to claim 1, wherein said polymer is a thermoplastic.

15. A flame-retardant polymer composition according to claim 1, wherein said polymer is a thermoset resin.

16. A flame-retardant polymer composition according to claim 1, wherein said polymer is a polyolefin.

* * * * *